(12) United States Patent
Tian et al.

(10) Patent No.: US 11,680,548 B2
(45) Date of Patent: Jun. 20, 2023

(54) FUEL SYSTEM HAVING PUMPING AND FILTRATION FUEL MODULE AND FLOW HOUSING FOR SAME

(71) Applicant: Caterpillar Inc., Peoria, IL (US)

(72) Inventors: Ye Tian, Bloomington, IL (US); Quinton Marcus Burear, Peoria, IL (US); Michael Taylor McKinley, Washington, IL (US); Stephan Donald Roozenboom, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/688,206

(22) Filed: Mar. 7, 2022

(65) Prior Publication Data

US 2022/0186695 A1 Jun. 16, 2022

Related U.S. Application Data

(62) Division of application No. 16/854,567, filed on Apr. 21, 2020, now Pat. No. 11,268,482.

(51) Int. Cl.

| | | |
|---|---|---|
| *F02M 37/44* | (2019.01) | |
| *F02M 37/08* | (2006.01) | |
| *F02M 37/18* | (2006.01) | |
| *B01D 27/08* | (2006.01) | |
| *B01D 27/14* | (2006.01) | |

(52) U.S. Cl.
CPC ............ *F02M 37/44* (2019.01); *F02M 37/08* (2013.01); *F02M 37/18* (2013.01); *B01D 27/08* (2013.01); *B01D 27/146* (2013.01); *B01D 2221/14* (2013.01)

(58) Field of Classification Search
CPC ........ F02M 37/44; F02M 37/08; F02M 37/18; F02M 37/42; F02M 37/34; B01D 27/08; B01D 27/146; B01D 2221/14; B01D 29/56; B01D 2201/303; B01D 35/26
See application file for complete search history.

(56) References Cited

U.S. PATENT DOCUMENTS

| | | | |
|---|---|---|---|
| 7,069,913 B1 | 7/2006 | Crary | |
| 7,464,696 B2 | 12/2008 | Furusawa | |
| 10,465,644 B2 | 11/2019 | Nah | |
| 2013/0144507 A1 | 6/2013 | Lee | |
| 2014/0251275 A1 | 9/2014 | Lana | |
| 2014/0331974 A1* | 11/2014 | Ahmad | F02M 37/12 123/495 |
| 2016/0230720 A1* | 8/2016 | Hackett | B01D 29/56 |

(Continued)

FOREIGN PATENT DOCUMENTS

| | | |
|---|---|---|
| CN | 106640449 B | 5/2018 |
| DE | 102006000016 | 7/2006 |
| DE | 102006000016 A1 | 7/2006 |

*Primary Examiner* — Jacob M Amick
*Assistant Examiner* — Charles J Brauch
(74) *Attorney, Agent, or Firm* — Brannon Sowers & Cracraft PC (57) ABSTRACT

A fuel module for pumping and filtration of a fuel in a fuel system includes a flow housing, and each of an electrically powered pump, a first cartridge filter, and a second cartridge filter in sealed, direct engagement with the flow housing. The fuel module is applied in a low pressure fuel circuit feeding fuel to a high pressure fuel circuit for pressurization to an injection pressure. Electronic closed loop control techniques for the pump are also disclosed.

20 Claims, 5 Drawing Sheets

(56) References Cited

U.S. PATENT DOCUMENTS

| | | |
|---|---|---|
| 2016/0333834 A1 | 11/2016 | Ohrt |
| 2018/0128219 A1 | 5/2018 | Kapp |
| 2018/0223784 A1 | 9/2018 | Willis |
| 2019/0085791 A1* | 3/2019 | Rike .................. F02M 21/0212 |
| 2019/0316554 A1 | 10/2019 | Berg |

* cited by examiner

FUEL SYSTEM HAVING PUMPING AND FILTRATION FUEL MODULE AND FLOW HOUSING FOR SAME

TECHNICAL FIELD

The present disclosure relates generally to a fuel system for an internal combustion engine, and more particularly to a fuel module integrating cartridge filters and an electric drive pump.

BACKGROUND

Fuel systems can be the most complex and sophisticated part of modern internal combustion engine systems. A typical fuel system can employ dozens or even hundreds of moving parts commonly operated at high speeds while subjected to high absolute pressures and rapid pressure changes. In a typical diesel engine fuel system, the fuel stored in a tank is desirably increased substantially in pressure for injection into combustion cylinders in the engine. In some systems fuel pressurization is achieved with dedicated unit pumps associated with or integral to each one of a plurality of fuel injectors. In other systems a pressurized common reservoir of fuel is maintained for delivery as needed to each of the fuel injectors in the fuel system. Various combinations and variations on these two basic strategies for fuel delivery and pressurization are well known.

In any fuel system it is also generally desirable to limit debris in the flow of fuel between and among components to prevent damage or performance degradation, particularly with regard to pumps and fuel injectors. For this reason most fuel systems are equipped with various filtration apparatus for trapping particles that are introduced when the fuel supply is replenished, or produced in situ by operation of the fuel system components themselves. In any case, multiple pumps, including a fuel transfer pump and at least one high pressure pump, and multiple filters are typically used, requiring various lines, fittings, housings, mounting hardware, and other equipment for supporting and packaging the components for service. United States Patent Application Publication No. 20160333834 sets forth one example low pressure fuel supply system using a plurality of fuel injection pumps.

SUMMARY OF THE INVENTION

In one aspect, a fuel system for an engine includes a high pressure fuel circuit having a high pressure pump with a pump drive gear for engagement with a gear train on the engine, and a low pressure fuel circuit including a low pressure pump having a pump electric drive motor and being structured to feed fuel to the high pressure fuel circuit for pressurization to an injection pressure. The low pressure fuel circuit further includes first cartridge filter, a second cartridge filter, and a flow housing. The flow housing forms a fuel inlet, a fuel outlet to the high pressure fuel circuit, and a plurality of internal fuel conduits. The low pressure pump, the first cartridge filter, and the second cartridge filter are each in sealed, direct engagement with the flow housing and, together with the plurality of internal fuel conduits, fluidly connect the fuel inlet to the fuel outlet.

In another aspect, a fuel module for pumping and filtration of a fuel in a fuel system for an internal combustion engine includes a flow housing forming a fuel inlet for receiving fuel to be pumped and filtered in the fuel module, and a fuel outlet. The flow housing further forms an outgoing pump port and an incoming pump port, a first cartridge receptacle positioned fluidly between the fuel inlet and the outgoing pump port, and a second cartridge receptacle positioned fluidly between the incoming pump port and the fuel outlet. The fuel module further includes a first cartridge filter installed in the first cartridge receptacle and fluidly connecting the fuel inlet to the outgoing pump port, and a second cartridge filter installed in the second cartridge receptacle and fluidly connecting the incoming pump port to the fuel outlet. The fuel module still further includes a pump having a pump electric drive motor and attached to the flow housing such that the pump is fluidly connected to the outgoing pump port and the incoming pump port.

In still another aspect, a flow housing for a pumping and filtration fuel module in a fuel system for an internal combustion engine includes a flow housing body having a pump side with a pump-housing interface structured for lineless installation of a pump, and including a planar pump mounting surface, an outgoing pump port and an incoming pump port each surrounded by the planar pump mounting surface. The pump-housing interface further includes a plurality of bolting holes formed in the flow housing body for bolting the pump to the flow housing body. The flow housing body further includes a filter side opposite to the pump side and having formed therein each of a first filter receptacle structured to receive a first cartridge filter and a second filter receptacle structured to receive a second cartridge filter. The flow housing body further forms a fuel inlet to receive a fuel to be pumped and filtered in the pumping and filtration fuel module, a fuel outlet, and a plurality of internal fuel conduits. The plurality of internal fuel conduits form a disjunctive fuel flow path extending between the fuel inlet and the fuel outlet and interrupted at the pump-housing interface, the first filter receptacle, and the second filter receptacle, such that upon installation of the pump, the first cartridge filter, and the second cartridge filter, the fuel flow path is made continuous.

DETAILED DESCRIPTION

Figure 1:
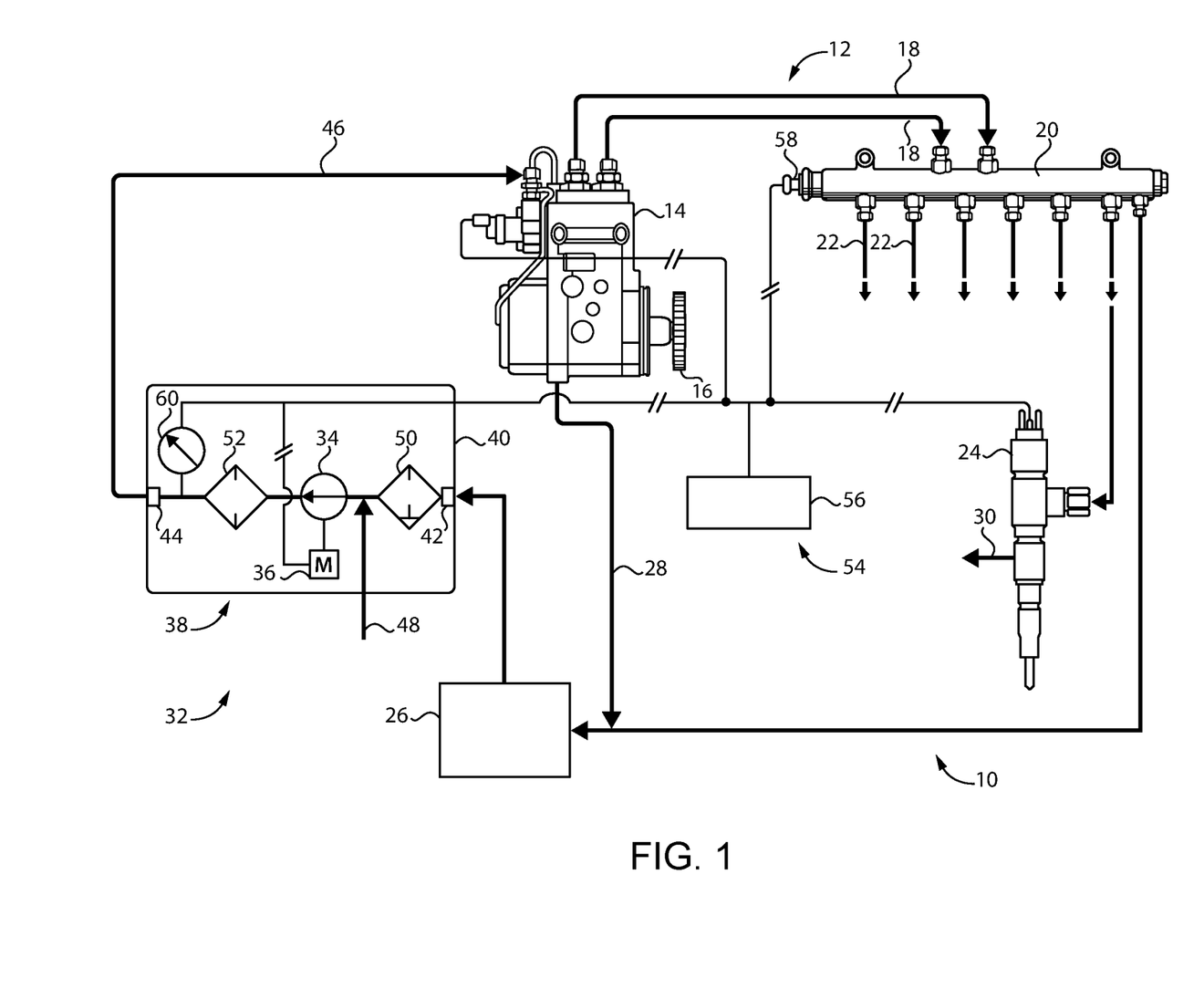
FIG. 1 is a diagrammatic view of a fuel system, according to one embodiment.

Referring to FIG. 1, there is shown a fuel system 10 for an internal combustion engine. Fuel system 10 includes a high pressure fuel circuit 12 having a high pressure pump 14 with a pump drive gear 16 for engagement with a gear train on an internal combustion engine. Fuel system 10 also includes a low pressure fuel circuit 32 having a low pressure pump 34 with a pump electric drive motor 36 and being structured to feed fuel to the high pressure fuel circuit 12 for pressurization to an injection pressure. Fuel system 10 may be deployed in a compression-ignition internal combustion engine system, such as an engine operating on diesel distillate fuel, however, the present disclosure is not thereby limited.

In the illustrated embodiment a plurality of high pressure feed lines 18 extend between high pressure pump 14 and a pressurized fuel reservoir 20. A plurality of fuel delivery conduits 22 extend from reservoir 20 to supply fuel pressurized to the injection pressure to a plurality of fuel injectors, one of which is shown at 24. Fuel injector 24 may be positioned at least partially in a combustion cylinder in the internal combustion engine for direct injection. In other embodiments fuel injectors could be positioned for port injection, for injection into an engine intake conduit, or in still another configuration. Reservoir 20 may be configured as a so-called common rail that stores fuel at the injection pressure for all or a portion of fuel injectors in fuel system 10. In other embodiments, fuel system 10 could be deployed with a plurality of unit pumps each associated with one or more fuel injectors, or any of a number of other fuel system configurations.

Fuel system 10 further includes a fuel tank 26, with low pressure fuel circuit 32 being positioned fluidly between fuel tank 26 and high pressure fuel circuit 12. Fuel system 10 further includes a fuel module 38 for pumping and filtration of fuel and having a flow housing 40 forming a fuel inlet 42, and a fuel outlet 44 to high pressure fuel circuit 12. In most embodiments fuel tank 26 may be equipped with a fuel prefilter. Module 38 may also include a first cartridge filter 50, a second cartridge filter 52, and other flow directing, pumping, and filtration features as further discussed herein. First cartridge filter 50 may be a primary filter including a water separator, with second filter 52 being a secondary filter. First cartridge filter 50 is arranged fluidly between fuel inlet 42 and low pressure pump 34, whereas second cartridge filter 52 is arranged fluidly between low pressure pump 34 and fuel outlet 44 such that module 38 supports first cartridge filter 50, low pressure pump 34, and second cartridge filter 52 in a serial filter-pump-filter service configuration.

Module 38, and including flow housing 40, may further form a fuel return inlet path 48 for fuel drained from the associated engine to return the same to low pressure fuel circuit 32. A return or outlet line 30 is shown extending from fuel injector 24. Return line 30 could extend directly to inlet path 48, or to fuel tank 26, by way of any suitable plumbing arrangement. Those skilled in the art will be familiar with draining of fuel from a high pressure side of a fuel system back to a fuel tank or to a low pressure side of the fuel system by way of a variety of strategies. Another return line 28 extends from high pressure pump 14 and can analogously return fuel to fuel tank 26 or otherwise to low pressure fuel circuit 32. A fuel supply line 46 extends from flow housing 40 to high pressure pump 14. In certain known fuel systems a low pressure pump is mounted directly upon a high pressure pump. According to the present disclosure, it will be appreciated that low pressure pump 34 and certain other components of low pressure fuel circuit 32 are not mounted upon high pressure pump 14, and can be mounted at a variety of other locations including to a frame or a housing, an engine enclosure, or to still other structures in an associated machine system.

Fuel system 10 also provides for control, including closed loop control, of low pressure pump 34 to provide a desired outlet pressure and/or flow to high pressure fuel circuit 12. In some instances, low pressure or fuel transfer pump operation can lag behind what is optimal for feeding fuel to a high pressure pump, especially during cranking, as the transfer pump operation is coupled to operation of the engine. According to the present disclosure, low pressure pump 34 can be sped up or slowed down as needed to provide a desired pressure and/or flow of fuel to high pressure fuel circuit 12.

To this end, fuel system 10 further includes a control system 54. Control system 54 includes an electronic control unit 56 that is coupled with and in control communication with a variety of actuators in fuel system 10 and receives inputs from a variety of sensors. A rail pressure sensor 58 may be coupled with reservoir 20, and electronic control unit 56 may receive a rail pressure signal from rail pressure sensor 58 and responsively adjust an output of high pressure pump 14, for example by varying a position of an inlet metering valve or an outlet metering valve in high pressure pump 14, varying a displacement of pumping elements in high pressure pump 14, or some other variable. Electronic control unit 56 is also coupled with module 38, including with pump electric drive motor 36, and can vary a pump speed of low pressure pump 34 to provide the desired output to high pressure pump 14. Control system 54 may also include a pressure sensor 60 arranged fluidly between second cartridge filter 52 and fuel outlet 34. Pressure sensor 60 may produce an outlet pressure signal, with electronic control unit 56 being structured to vary pump speed based on the outlet pressure signal. In one implementation, electronic control unit 56 includes a proportional controller. The proportional controller can further include a proportional-integral-derivative controller or PID. Pump electric drive motor 36 can include a brushless electric motor in one example. In medium to heavy duty diesel engine applications, the relatively high flow rate of fuel from low pressure fuel circuit 32 to high pressure fuel circuit 12, among other factors, can make a PID control strategy successful and advantageous. Electronic control unit 56 can include any suitable computerized control unit having a central processing unit including, for example, a microprocessor or a micro-controller.

Figure 2:
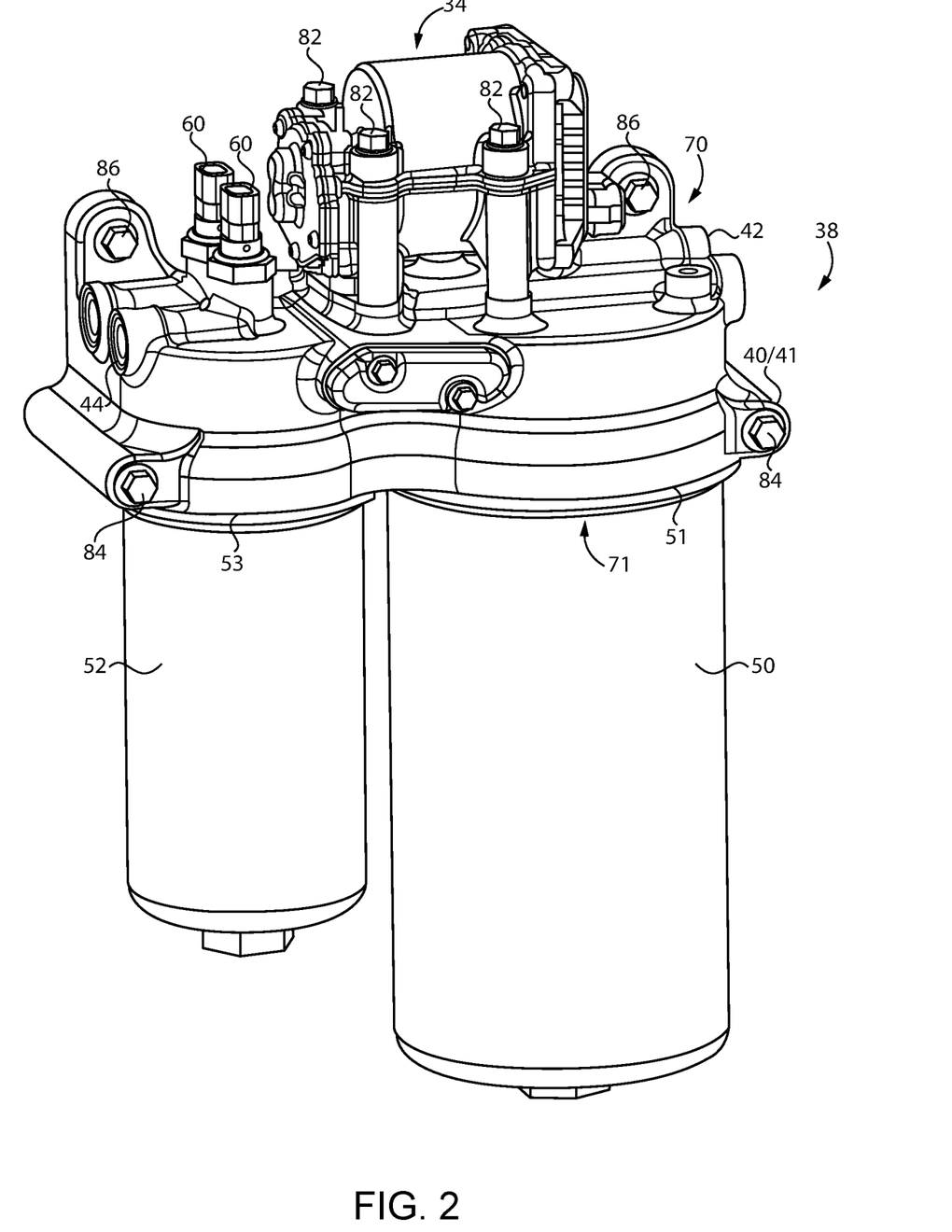
FIG. 2 is a diagrammatic view of a fuel module, according to one embodiment.
Figure 3:
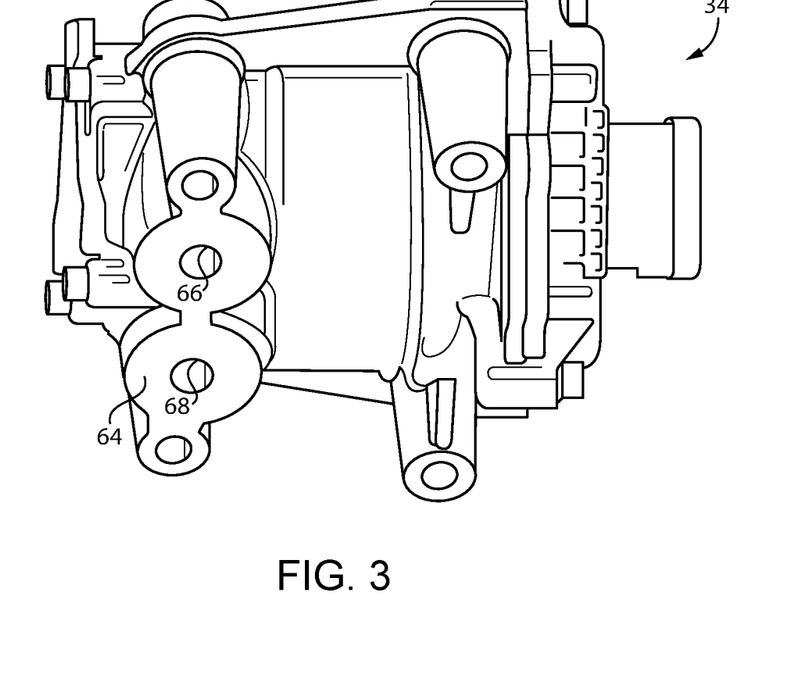
FIG. 3 is a diagrammatic view of a pump, according to one embodiment.

Referring also now to FIG. 2, there are shown additional features and details of module 38. Flow housing 40 includes a flow housing body 41. Discussion herein of flow housing 40 and flow housing body 41 should be understood to refer to either of the components interchangeably. As noted above, first cartridge filter 50 is arranged fluidly between fuel inlet 42 and low pressure pump 34, and can thus be understood as arranged upstream of low pressure pump 34 to filter an incoming flow of fuel from fuel inlet 42 to low pressure pump 34. Second cartridge filter 52 is arranged downstream of low pressure pump 34 to filter an outgoing flow of fuel from low pressure pump 34 to fuel outlet 44. Flow housing 40 is also equipped with various features for mounting first cartridge filter 50, second cartridge filter 52, and low pressure pump 34.

Referring also now to FIGS. 3, 4, 5, and 6, flow housing 40 further forms an outgoing pump port 76 to feed fuel filtered in first cartridge filter 50 to low pressure pump 34, and an incoming pump port 78 to receive fuel pumped by low pressure pump 34 for feeding to second cartridge filter 52. Flow housing 40 also forms a first cartridge receptacle 51 positioned fluidly between fuel inlet 40 and outgoing pump port 76, and a second cartridge receptacle 53 positioned fluidly between incoming pump port 78 and fuel outlet 44. First cartridge filter 50 is installed in first cartridge receptacle 51 and fluidly connects fuel inlet 42 to outgoing pump port 76. Second cartridge filter 52 is installed in second cartridge receptacle 53 and fluidly connects incoming pump port 78 to fuel outlet 44. Low pressure pump 34 is attached to flow housing 40 such that low pressure pump 34 is fluidly connected to outgoing pump port 76 and incoming pump port 78, and low pressure pump 34, first cartridge filter 50, and second cartridge filter 52 are each in sealed, direct engagement with flow housing 40. Flow housing 40 also forms a plurality of internal fuel conduits, and low pressure pump 34, first cartridge filter 50, and second cartridge filter 52, together with the plurality of internal fuel conduits, fluidly connect fuel inlet 42 to fuel outlet 44. The plurality of internal fuel conduits, further discussed herein, form a disjunctive fuel flow path extending between fuel inlet 42 and fuel outlet 44. Flow housing 40 also includes a pump side 70 having a pump-housing interface 72 structured for lineless installation of low pressure pump 34, and the fuel flow path is interrupted at pump-housing interface 72, first filter receptacle 51, and second filter receptacle 53, such that upon installation of low pressure pump 24, first cartridge filter 50, and second cartridge filter 52, the fuel flow path is made continuous.

Figure 4:
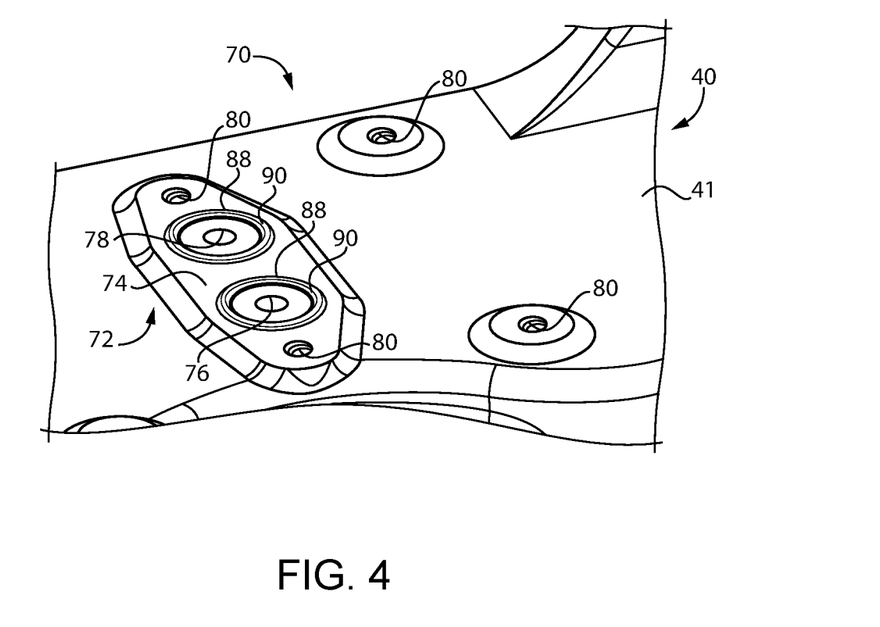
FIG. 4 is a diagrammatic view of a portion of a flow housing for a fuel module, according to one embodiment.

Pump-housing interface 72 includes a planar pump mounting surface 74, with outgoing pump port 76 and incoming pump port 78 each being surrounded by planar pump mounting surface 74. Pump-housing interface 72 also includes a plurality of bolting holes 80 formed in flow housing body 41 for bolting low pressure pump 34 to flow housing body 41. As shown in FIG. 2, a plurality of bolts 82 may be passed through low pressure pump 34 and received in bolting holes 80. Bolting holes 80 may be internally threaded in some embodiments. It can also be seen from FIG. 3 that low pressure pump 34 includes a planar pump surface 64, and a pump inlet 66 and a pump outlet 68 formed in planar pump surface 64. Threaded bolting holes 80 are formed in pump side 70, and the receipt and retention of bolts 82 in bolting holes 80 clamps low pressure pump 34 to pump side 70. As also shown in FIG. 4 pump-housing interface 72 also includes a plurality of seal annuluses 88 each extending circumferentially around one of outgoing pump port 76 or incoming pump port 78, and a plurality of seals 90 positioned one within each seal annulus 88. Clamping of low pressure pump 34 to flow housing 40 compresses seals 90 to enable the direct, sealed engagement of low pressure pump 34 with flow housing 40 without the need for any intervening lines.

Figure 5:
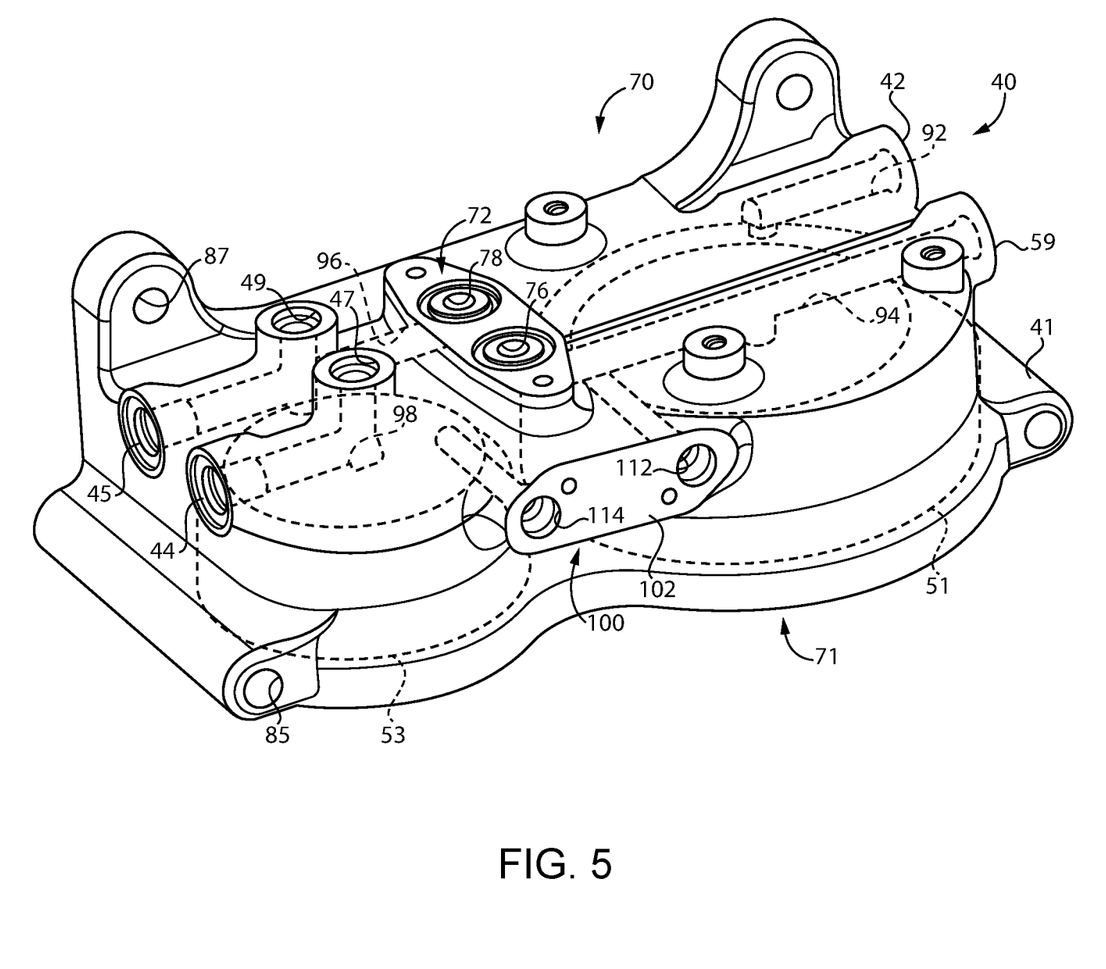
FIG. 5 is a diagrammatic view of a flow housing for a fuel module, according to one embodiment.
Figure 6:
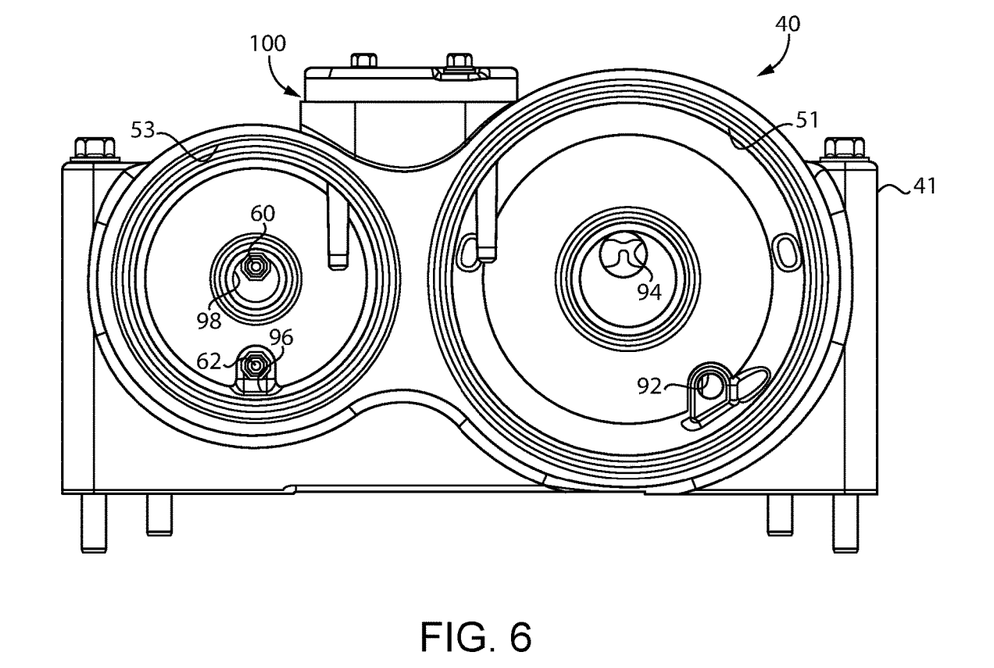
FIG. 6 is another diagrammatic view of a flow housing for a fuel module, according to one embodiment.

Flow housing body 41 further includes a filter side 71 opposite to pump side 70 and having formed therein each of first filter receptacle 51, to receive first cartridge filter 50, and second filter receptacle 53, to receive second cartridge filter 52. Each of first filter receptacle 51 and second filter receptacle 53 may be threaded such that the respective cartridge filters 50 and 52 may be rotated into or out of engagement with flow housing 40, forming the necessary seals with flow housing 40 to route fuel through module 38 for pumping and filtration as discussed herein.

Flow housing 40 may also be provided with various ports for connecting sensors used in operating fuel system 10 and in controlling low pressure pump 34. Flow housing 40 forms a sensor port fluidly connected to one of first filter receptacle 51, second filter receptacle 53, or one of the plurality of internal fuel conduits in flow housing 40. Fuel system 10, and module 38, further includes a sensor installed in the sensor port. In the illustrated embodiment, a first sensor port 47 is arranged fluidly between second cartridge filter 52 and fuel outlet 44. Flow housing 40 forms a second sensor port 49 arranged fluidly between low pressure pump 34 and second cartridge filter 52. Fuel system 10 and module 38 may further include a first sensor installed in first sensor port 47 and a second sensor installed in second sensor port 49. A first sensor 60 and a second sensor 62, which may each include a fluid pressure sensor, are shown installed in flow housing 40 in the illustration of FIG. 2. Each of first sensor 60 and second sensor 62 may be in communication with electronic control unit 56. As discussed above, sensor 60 may produce a pump outlet pressure signal. Sensor 62 may also produce a pressure signal, and electronic control unit 56 may be structured to determine a pressure drop across second cartridge filter 52 based upon the pressure signals produced by first sensor 60 and second sensor 62. An additional sensor port may be formed by flow housing 40, and is shown at 45 in FIG. 5. Sensor port 45 could receive still another sensor, such as a temperature sensor in some embodiments.

FIGS. 5 and 6 also illustrate some of the internal fuel conduits formed by flow housing 40 and mentioned above. An incoming conduit 92 extends from fuel inlet 42 to filter receptacle 71. A second conduit 94 extends from filter receptacle 71 to outgoing pump port 76. A third conduit 96 extends from incoming pump port 78 to filter receptacle 53. An outgoing fuel conduit 98 extends from filter receptacle 53 to fuel outlet 44. Another fuel inlet 59 is formed by flow housing 40 and can receive fuel returned to low pressure circuit 32 from an engine as discussed herein. It will be recalled that the plurality of internal fuel conduits in flow housing 40 form a disjunctive fuel flow path. From the illustration of FIG. 5, and the present description, it will be understood that installation of first cartridge filter 50, second cartridge filter 52, and low pressure pump 34 fluidly connects the various internal fuel conduits to make the internal fuel flow path continuous.

The illustration of the locations of some of the sensor ports and internal fuel conduits is illustrative only. Sensor port 47 fluidly connects to the fuel flow path at a location that is fluidly between incoming pump port 78 and fuel outlet 44, and as illustrated fluidly connects to outgoing fuel conduit 98. Sensor port 49 is fluidly connected to the fuel flow path at a location that is fluidly between incoming pump port 78 and first sensor port 47. The locations and fluid connections of sensor ports 47, 49, 45 could be modified to connect to the fuel flow path extending from fuel inlet 42 to fuel outlet 44 at a variety of other locations. For example, in some instances it might be desirable to determine a pressure drop across low pressure pump 34 or across first cartridge filter 50, and for such purposes a sensor port could be located so as to fluidly connect to the fuel flow path at different suitable upstream and downstream locations than those shown. Still other alternatives will be apparent to those skilled in the art.

Figure 7:
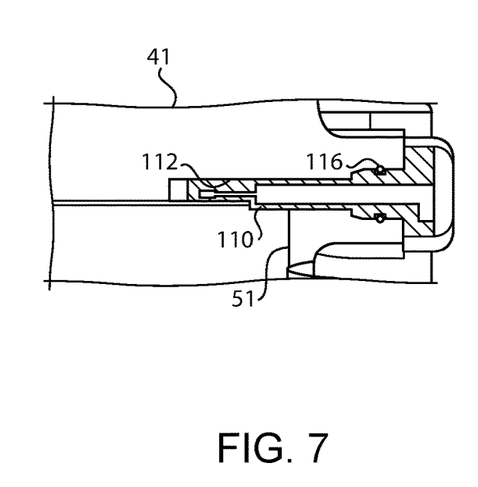
FIG. 7 is a sectioned side diagrammatic view of a portion of a fuel module, according to one embodiment.
Figure 8:
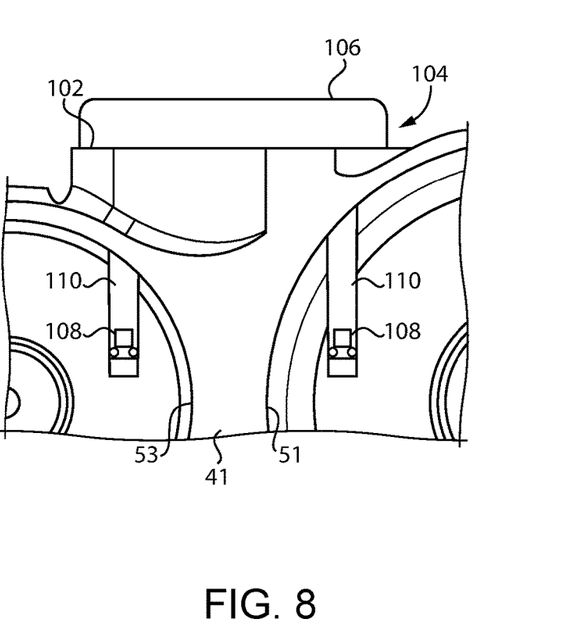
FIG. 8 is another view of a portion of a fuel module, according to one embodiment.

Referring now also to FIGS. 7 and 8, there are shown additional details of flow housing 40, and including a sensor mounting interface 100 of flow housing 40. A sensor assembly 104 is mounted to sensor mounting interface 100, which includes a planar sensor mounting surface 102. Sensor assembly 104 may include a sensor body 106, and a plurality of sensors 108 each disposed upon a sensor leg 102. Flow housing 40 forms a first sensor leg tube 112 extending from sensor mounting surface 102 toward filter receptacle 51, and a second sensor leg tube 114 extending from sensor mounting surface 102 toward second filter receptacle 53. As shown in FIG. 7, a seal 116, such as an O-ring seal, extends circumferentially around the illustrated sensor leg 110 and fluidly seals with flow housing body 41. Also in the illustrated embodiment, each of sensors 108 may include a filter identification or ID sensor, such that a filter type, manufacturer, or other information associated with cartridge filters 50 and 52 can be determined. Sensor assembly 104 may include suitable electrical circuitry for communicating with electronic control unit 56, and thus forms part of control system 54. Sensors 108 may include magnetic sensors, radio frequency sensors, or still others, structured to interact with magnets, RF tags, etc. upon installed cartridge filters, and are positioned by way of flow housing 40 and the design of sensor assembly 104 itself in proximity with cartridge filters installed in filter receptacles 51 and 53 for scanning and/or otherwise interacting with the same.

INDUSTRIAL APPLICABILITY

During operation of fuel system 10, low pressure pump 34 may be operated to pump and filter fuel from fuel tank 26 for supplying to high pressure pump 14 by way of fuel supply line 46. The fuel can be sucked from fuel tank 26 by the operation of pump 34 through first cartridge filter 50, and then conveyed through second cartridge filter 52, and then out through fuel outlet 44. As noted above, first cartridge filter 50 may include a water separator, collecting water from the fuel by way of gravity, for example. The fuel supplied to high pressure pump 14 can be pressurized to an injection pressure, with high pressure pump 14 operated to maintain a pressure of fuel in reservoir 20 at the injection pressure, with suitable adjustments made based upon the operation of electronic control unit 56. Pressurized fuel from reservoir 20 can be injected by way of fuel injector 24 and any other fuel injectors into combustion cylinders in an associated engine. Fuel that is not injected can be returned by way of return line 30 to fuel tank 26, or potentially directly to fuel module 40 as discussed herein.

Control system 54 is structured to monitor outlet pressure of module 40 and vary pump speed of low pressure pump 34 in a closed loop fashion to provide high pressure fuel circuit 12 a suitable flow and pressure of fuel. In certain earlier systems, low pressure transfer pump operation was directly coupled to high pressure fuel pump and engine operation. According to the present disclosure, the operation of low pressure and high pressure pumps can be separated, and low pressure pump 34 actively controlled so as to avoid supplying too little fuel, too much fuel, or fuel at the wrong pressure to the high pressure side of the fuel system. Such capabilities can enable, among other things, faster engine starting as low pressure fuel pump operation is not dependent upon engine cranking. Moreover, reduced pressure pulsations and an overall smoother flow rate with changes in engine speed is expected to be observed. Integrating the various components into a separate, stand-alone fuel module for pumping and filtration on the low pressure side is also contemplated to reduce the number of lines for carrying fuel that are necessary and improve packaging.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel module for a fuel system for an internal combustion engine comprising:
    a flow housing forming a fuel inlet for receiving fuel to be pumped and filtered in the fuel module, and a fuel outlet;
    the flow housing further forming an outgoing pump port and an incoming pump port, a first filter receptacle positioned fluidly between the fuel inlet and the outgoing pump port, and a second filter receptacle positioned fluidly between the incoming pump port and the fuel outlet;
    a first cartridge filter installed in the first filter receptacle and fluidly connecting the fuel inlet to the outgoing pump port;
    a second cartridge filter installed in the second filter receptacle and fluidly connecting the incoming pump port to the fuel outlet; and
    a pump having a pump electric drive motor and fluidly connected to the outgoing pump port and the incoming pump port;
    the pump being mounted externally of the flow housing, such that the pump is arranged to convey fuel outside of the flow housing between the outgoing pump port and the incoming pump port.

2. The fuel module of claim 1 wherein the flow housing includes a pump side having a planar pump mounting surface, and a filter side having the first filter receptacle and the second filter receptacle formed therein;
    the fuel module further comprising a first seal and a second seal clamped between the flow housing and the pump and fluidly sealing around the outgoing pump port and the incoming pump port, respectively.

3. The fuel module of claim 2 wherein a plurality of threaded bolting holes are formed in the pump side, and further comprising bolts received in the plurality of threaded bolting holes and clamping the pump to the pump side.

4. The fuel module of claim 1 wherein each of the first filter receptacle and the second filter receptacle is threaded.

5. The fuel module of claim 1 further comprising a filter ID sensor assembly installed in the flow housing and having a first sensor leg and a second sensor leg extending toward the first filter receptacle and the second filter receptacle, respectively.

6. The fuel module of claim 1 wherein the flow housing forms a first sensor port and a second sensor port each arranged fluidly between the pump and the fuel outlet; and
    the fuel module further comprising a first pressure sensor and a second pressure sensor installed in the first sensor port and the second sensor port, respectively.

7. A flow housing for a fuel module in a fuel system for an internal combustion engine comprising:
    a flow housing body including a pump side having an outgoing pump port and an incoming pump port each opening upon the pump side;
    the flow housing body further including a filter side opposite to the pump side and having formed therein each of a first filter receptacle structured to receive a first cartridge filter and a second filter receptacle structured to receive a second cartridge filter;
    the flow housing body further forming a fuel inlet to receive a fuel to be pumped and filtered in the fuel module, a fuel outlet, and a plurality of internal fuel conduits;

the plurality of internal fuel conduits forming a disjunctive fuel flow path extending between the fuel inlet and the fuel outlet, and upon fluidly connecting a pump to the outgoing pump port and the incoming pump port, and installation of the first filter and the second filter, the fuel flow path is made continuous; and the flow housing body further including a plurality of bolt holes formed therein and extending horizontally through the flow housing body at locations between the pump side and the filter side.

8. The flow housing of claim 7 wherein the flow housing body forms a sensor port fluidly connected to the fuel flow path at a location that is fluidly between the incoming pump port and the fuel outlet.

9. The flow housing of claim 8 wherein the flow housing body further forms a second sensor port that is fluidly connected to the fuel flow path at a location that is fluidly between the incoming pump port and the first sensor port.

10. The flow housing of claim 7 wherein the flow housing body further includes a sensor mounting interface including a sensor mounting surface, a first sensor leg tube extending from the sensor mounting surface toward the first filter receptacle, and a second sensor leg tube extending from the sensor mounting surface toward the second filter receptacle.

11. The flow housing of claim 8 wherein the plurality of bolt holes includes a first bolt hole at a first end of the flow housing body and a second bolt hole at a second end of the flow housing body.

12. The flow housing of claim 7 wherein a sensor port is formed in the flow housing body upon the pump side and fluidly connects to the second filter receptacle.

13. The flow housing of claim 7 wherein the flow housing body includes an outer body surface extending between the pump side and the filter side, and the outer body surface forms a first curved profile extending partially circumferentially around the first filter receptacle, and a second curved profile extending partially circumferentially around the second filter receptacle.

14. A fuel module for a fuel system comprising:
a flow housing forming a fuel inlet, and a fuel outlet, and including a filter side and a pump side;
the flow housing further forming an outgoing pump port and an incoming pump port each opening in the pump side, a first filter receptacle opening in the filter side and positioned fluidly between the fuel inlet and the outgoing pump port, and a second filter receptacle opening in the filter side and positioned fluidly between the incoming pump port and the fuel outlet;
a first cartridge filter installed in the first filter receptacle and fluidly connecting the fuel inlet to the outgoing pump port; and
a second cartridge filter installed in the second filter receptacle and fluidly connecting the incoming pump port to the fuel outlet;
each of the first cartridge filter and the second cartridge filter projecting vertically from the flow housing, and the flow housing further having formed therein a plurality of bolt holes extending horizontally through the flow housing.

15. The fuel module of claim 14 wherein the plurality of bolt holes are located vertically between the filter side and the pump side.

16. The fuel module of claim 14 wherein the flow housing further having formed therein a first conduit extending from the fuel inlet to the first filter receptacle, a second conduit extending from the first filter receptacle to the outgoing pump port, a third conduit extending from the incoming pump port to the second filter receptacle, and a fourth conduit extending from the second filter receptacle to the fuel outlet.

17. The fuel module of claim 14 further comprising at least one sensor port opening in an outer surface of the flow housing and extending to the first filter receptacle, and at least one sensor port opening in the outer surface of the flow housing and extending to the second filter receptacle.

18. The fuel module of claim 14 wherein the flow housing includes an outer surface extending between the pump side and the filter side, and the outer surface forms a first curved profile extending partially circumferentially around the first filter receptacle, and a second curved profile extending partially circumferentially around the second filter receptacle.

19. The fuel module of claim 18 wherein the first filter receptable is larger in diameter than the second filter receptacle, and the outer surface forms a necked-down profile between the first filter receptacle and the second filter receptacle.

20. The fuel module of claim 14 wherein the flow housing includes a one-piece flow housing.

* * * * *